US012021632B2

(12) United States Patent
Jardel et al.

(10) Patent No.: US 12,021,632 B2
(45) Date of Patent: Jun. 25, 2024

(54) INCONSISTENCY FREE PIPELINED HYBRID AUTOMATIC REPEAT REQUEST SCHEME FOR NON-TERRESTRIAL NETWORK CHANNEL

(71) Applicant: Nokia Technologies Oy, Espoo (FI)

(72) Inventors: Fanny Jardel, La Norville (FR); Rafhael Amorim, Aalborg (DK); Jie Chen, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 416 days.

(21) Appl. No.: 17/378,316

(22) Filed: Jul. 16, 2021

(65) Prior Publication Data
US 2022/0045799 A1  Feb. 10, 2022

Related U.S. Application Data

(60) Provisional application No. 63/062,197, filed on Aug. 6, 2020.

(51) Int. Cl.
*H04L 1/18* (2023.01)
*H04L 1/1812* (2023.01)
*H04L 1/1867* (2023.01)

(52) U.S. Cl.
CPC .......... *H04L 1/1812* (2013.01); *H04L 1/1887* (2013.01)

(58) Field of Classification Search
CPC ... H04W 28/04; H04W 72/04; H04W 72/042; H04W 88/08; H04L 5/0007; H04L 1/1812; H04L 1/1887
USPC ...................................................... 370/329
See application file for complete search history.

(56) References Cited

U.S. PATENT DOCUMENTS

| 8,320,319 | B2* | 11/2012 | Lohr ..................... H04W 72/23 370/252 |
| 11,689,322 | B2* | 6/2023 | Lin ........................ H04L 1/1822 370/329 |
| 2018/0324889 | A1* | 11/2018 | Babaei .................. H04L 5/0053 |
| 2021/0105761 | A1* | 4/2021 | Cheng ................ H04B 7/18504 |

(Continued)

OTHER PUBLICATIONS

3GPP TSG RAN WG1 Meeting #98, Prague, Czech Republic, Aug. 26-30, 2019, R1-1908050, Agenda Item: 7.2.5.4, Source: Huawei, HiSilicon, CAICT, Title: Discussion on HARQ for NTN. (Year: 2019).*

(Continued)

*Primary Examiner* — Peter G Solinsky
*Assistant Examiner* — Sanjay K Dewan
(74) *Attorney, Agent, or Firm* — Lippes Mathias LLP

(57) ABSTRACT

Systems, methods, apparatuses, and computer program products for inconsistency free pipelined hybrid automatic repeat request scheme for non-terrestrial network channels. A method may include reserving or receiving reservation of physical layer resources exclusively for redundant transmission; allocating the physical layer resources and a predetermined number of transmit blocks, wherein the predetermined number of transmit blocks are associated with a downlink control information (DCI); checking a number of hybrid automatic repeat request process identifiers that are eligible for redundant transmission; and splitting the physical layer resources based on the number of hybrid automatic repeat request process identifiers that are eligible for redundant transmission.

14 Claims, 8 Drawing Sheets

(56) References Cited

U.S. PATENT DOCUMENTS

2023/0198679 A1* 6/2023 Bae .................. H04L 5/0094
370/329

OTHER PUBLICATIONS

3GPP TSG RAN WG1 #98, Prague, Czech Republic, Aug. 26-30, 2019, R1-1908819, Source: Panasonic, Title: HARQ and blind retransmission for NTN, Agenda Item: 7.2.5.4. (Year: 2019).*

3GPP TSG RAN WG1 #98, Prague, CZ, Aug. 26-30, 2019, R1-1908866, Source: CMCC, Title: Consideration on HARQ for Non-Terrestrial Networks, Agenda Item: 7.2.5.4. (Year: 2019).*

3GPP TSG-RAN WG1 Meeting #98, Prague, Czech Republic, Aug. 26-30, 2019, R1-1908933, Source: Asia Pacific Telecom, Title: Discussion on delay-tolerant re-transmission mechanisms for NTN, Agenda item: 7.2.5.4. (Year: 2019).*

3GPP TSG RAN WG1 #98, Prague, CZ, Aug. 26-30, 2019, R1-1909401, Source: ZTE, Title: Discussion on the HARQ procedure for NTN, Agenda Item: 7.2.5.4. (Year: 2019).*

3GPP TR 38.811 v15.2.0 (Sep. 2019), 3rd Generation Partnership Project; Technical Specification Group Radio Access Network; Study on New Radio (NR) to support non-terrestrial networks (Release 15). (Year: 2019).*

A. Guidotti et al., Satellite-enabled LTE Systems in LEO Constellations, ICC2017: WT05—1st International Workshop on Satellite Communications—Challenges and Integration in the 5G ecosystem. (Year: 2017).*

Oltjon Kodheli et al., Integration of Satellite in 5G through LEO Constellations, Oltjon Kodheli et al., 2017, IEEE. (Year: 2017).*

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NR; Physical layer procedures for data (Release 16)", 3GPP TS 38.214, V16.1.0, Mar. 2020, pp. 1-151.

"SpaceMobile", AST, Retrieved on Jul. 8, 2021, Webpage available at : https://ast-science.com/spacemobile/faqs/.

Bastia et al., "LTE Adaptation for Mobile Broadband Satellite Networks", EURASIP Journal on Wireless Communications and Networking, Article No. 989062, 2009, pp. 1-13.

Araniti et al., "Efficient Resource Allocation for Multicast Transmissions in Satellite-LTE Network", IEEE Global Communications Conference (GLOBECOM), Dec. 9-13, 2013, pp. 3023-3028.

Amadeo et al., "A Satellite-LTE Network with Delay-Tolerant Capabilities: Design and Performance Evaluation", IEEE Vehicular Technology Conference (VTC Fall), Sep. 5-8, 2011, 5 pages.

Guidotti et al., "Satellite-Enabled LTE Systems in LEO Constellations", IEEE International Conference on Communications Workshops (ICC Workshops), May 21-25, 2017, 6 pages.

Kodheli et al., "Integration of Satellites in 5G through LEO Constellations", IEEE Global Communications Conference, Dec. 4-8, 2017, 6 pages.

"3rd Generation Partnership Project; Technical Specification Group Radio Access Network; Study on New Radio (NR) to support non-terrestrial networks (Release 15)", 3GPP TR 38.811, V15.2.0, Sep. 2019, pp. 1-126.

"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-140.

"Discussion on HARQ for NTN", 3GPP TSG RAN WG1 Meeting #98, R1-1908050, Agenda : 7.2.5.4, Huawei, Aug. 26-30, 2019, 5 pages.

"HARQ and Blind Retransmission for NTN", 3GPP TSG RAN WG1 #98, R1-1908819, Agenda : 7.2.5.4 , Panasonic, Aug. 26-30, 2019, pp. 1-6.

"Considerations on HARQ for Non-Terrestrial Networks", 3GPP TSG RAN WG1 #98, R1-1908866, Agenda : 7.2.5.4, CMCC, Aug. 26-30, 2019, pp. 1-3.

"Discussion on Delay-tolerant Re-transmission Mechanisms for NTN", 3GPP TSG-RAN WG1 Meeting #98, R1-1908933, Agenda: 7.2.5.4, Asia Pacific Telecom, Aug. 26-30, 2019, 4 pages.

"Discussion on the HARQ procedure for NTN", 3GPP TSG RAN WG1 #98, R1-1909401, Agenda : 7.2.5.4, ZTE, Aug. 26-30, 2019, pp. 1-5.

Ahmad et al., "Enhanced HARQ for Delay Tolerant Services in Mobile Satellite Communications", Seventh International Conference on Advances in Satellite and Space Communications, Mar. 17, 2015, 6 pages.

"3rd Generation Partnership Project; Technical Specification Group Radio Access Network; NR; Multiplexing and channel coding (Release 16)", 3GPP TS 38.212, V16.1.0, Mar. 2020, pp. 1-146.

* cited by examiner

INCONSISTENCY FREE PIPELINED HYBRID AUTOMATIC REPEAT REQUEST SCHEME FOR NON-TERRESTRIAL NETWORK CHANNEL

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for inconsistency free pipelined hybrid automatic repeat request scheme for non-terrestrial network channels.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Various aspects of examples of the invention are set out in the claims.

According to a first aspect of the present invention, a method comprising: reserving or receiving reservation of physical layer resources exclusively for redundant transmission; allocating the physical layer resources and a predetermined number of transmit blocks, wherein the predetermined number of transmit blocks are associated with a downlink control information (DCI); checking a number of hybrid automatic repeat request process identifiers that are eligible for redundant transmission; and splitting the physical layer resources based on the number of hybrid automatic repeat request process identifiers that are eligible for redundant transmission.

According to a second aspect of the present invention, an apparatus comprising: at least one processor; and at least one memory including computer program code, wherein the at least one memory and the computer program code are configured, with the at least one processor, to cause the apparatus to at least: reserve or receive reservation of physical layer resources exclusively for redundant transmission; allocate the physical layer resources and a predetermined number of transmit blocks, wherein the predetermined number of transmit blocks are associated with a downlink control information (DCI); check a number of hybrid automatic repeat request process identifiers that are eligible for redundant transmission; and split the physical layer resources based on the number of hybrid automatic repeat request process identifiers that are eligible for redundant transmission.

According to a third aspect of the present invention, a non-transitory computer storage medium encoded with a computer program, the program comprising instructions that when executed by one or more computers cause the one or more computers to perform operations comprising: reserving or receiving reservation of physical layer resources exclusively for redundant transmission; allocating the physical layer resources and a predetermined number of transmit blocks, wherein the predetermined number of transmit blocks are associated with a downlink control information (DCI); checking a number of hybrid automatic repeat request process identifiers that are eligible for redundant transmission; and splitting the physical layer resources based on the number of hybrid automatic repeat request process identifiers that are eligible for redundant transmission.

According to a fourth aspect of the present invention, a method comprising: receiving packet on physical layer resources that are reserved exclusively for redundant transmission; determining whether the received packet are associated with a downlink control information (DCI); in response to determining the received packet are associated with the DCI, determining a number of hybrid automatic repeat request process identifiers that are eligible for redundant transmission; and decoding the packet associated with the number of hybrid automatic repeat request process identifiers.

According to a fifth aspect of the present invention, an apparatus comprising: at least one processor; and at least one memory including computer program code, wherein the at least one memory and the computer program code are configured, with the at least one processor, to cause the apparatus to at least: receive packet on physical layer resources that are reserved exclusively for redundant transmission; determine whether the received packet are associated with a downlink control information (DCI); in response to determining the received packet are associated with the DCI, determine a number of hybrid automatic repeat request process identifiers that are eligible for redundant transmission; and decode the packet associated with the number of hybrid automatic repeat request process identifiers.

According to a sixth aspect of the present invention, a non-transitory computer storage medium encoded with a computer program, the program comprising instructions that when executed by one or more computers cause the one or more computers to perform operations comprising: receiving packet on physical layer resources that are reserved exclusively for redundant transmission; determining whether the received packet are associated with a downlink control information (DCI); in response to determining the received packet are associated with the DCI, determining a number of hybrid automatic repeat request process identifiers that are eligible for redundant transmission; and decoding the packet associated with the number of hybrid automatic repeat request process identifiers.

BRIEF DESCRIPTION OF THE DRAWINGS

For proper understanding of example embodiments, reference should be made to the accompanying drawings, wherein.

DETAILED DESCRIPTION

Figure 1:
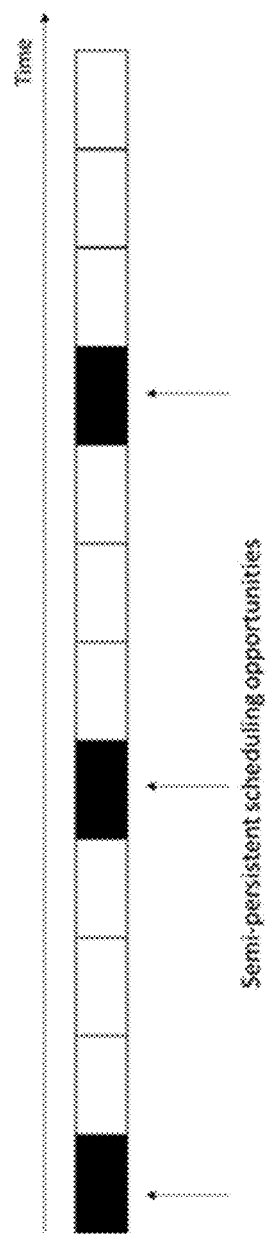
FIG. 1 illustrates configured semi-persistent scheduling (SPS) opportunities, according to certain example embodiments.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for inconsistency free pipelined hybrid automatic repeat request (HARQ) scheme for non-terrestrial network (NTN) channels.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

In certain cases, support for cellular deployment on low earth orbit (LEO) satellites may be provided with existing Long-Term Evolution (LTE) user equipment (UEs). Currently LEO satellites may be a repeater of the radio signal for providing global voice, Internet of things (IoT), and data coverage. Further, gateways such as baseband hotels generate radio frequency (RF) signals, which may be sent to the satellite. In addition, software at the gNB may be patched to handle satellite roundtrip time (RTT) of approximately 40 msec. As discussed in detail below, some example embodiments may address certain aspects of deploying cellular systems on LEO, and how to utilize data channels to convey redundancy parity check bits to ensure that the data transmission delay is reduced.

By exploiting the large footprint property, satellite-based systems may efficiently cover dense terrestrial networks, both in densely populated areas, and in rural zones. However, long roundtrip delays can be experienced due to considerable propagation delay between the UE and the satellite depending on the satellite orbit and elevation angle of the beam spot within the satellite cell. For instance, the roundtrip delay may be up to 41.77 ms at LEO satellite deployment, and up to 541.46 ms at geostationary earth orbit (GEO) satellite deployment.

Resource allocation algorithms for multicast transmission and transmission control protocol (TCP) performance have been analyzed in an LTE-based GEO system. However, to circumvent the issue with long trip delays, there has been a focus on LEO mega-constellations (i.e., systems in which hundreds of satellites are deployed to provide global coverage). Further, the impact of large delays and Doppler shifts on the physical layer (PHY) and medium access control (MAC) layer procedures for LEO satellites has been analyzed. Thus, reliable satellite communication may pose a challenge due to the limited available transmit power and bandwidth, significant channel attenuation, long channel delay, as well as time-varying channel conditions with a large Doppler spread. Accordingly, proper link adaptation may be useful so that an appropriate modulation and coding scheme (MCS) can be selected for each condition of the satellite's time-varying channel.

Large propagation delay may be an issue in NTN. For example, the RTT delay of LEO satellites at 1200 km may be up to 41.77 ms, and the roundtrip delay may rise to 541.46 ms for GEO satellites. The long RTT in NTN may have a direct impact on the number of HARQ processes as shown in Table 1. For instance, the number of required HARQ processes for GEO and LEO (with 1 ms slot duration and 15 kHz service capability server (SCS)) increases to approximately 600 and 50 in the worst-case scenarios, respectively. Thus, simply reusing current HARQ designs and increasing the number of HARQ processes may not be feasible due to the power and memory limitations at the UE side, as well as the signaling overhead for a large number of UEs at the next generation NodeB (gNB) side.

TABLE 1

Required number of HARQ processes, $N_{HARQ,min}$, assuming a 1 ms slot duration for 15 kHz reference sub-carrier spacing

| Constellation | Max. $T_{HARQ}$ | $N_{HARQ, min}$ processes for 1 ms slot operation |
|---|---|---|
| Terrestrial | 16 ms | 16 |
| LEO | 50 ms | 50 |
| MEO | 180 ms | 180 |
| GEO/HEO | 600 ms | 600 |

Additionally, the soft-buffer memories on the MAC layer implemented at the UE side may be expensive, and considerably extending the number of processes may increase the costs and challenges of producing UE devices. As such, it has been proposed that the network should be able to configure the UE when the HARG is "turned off." In such a case, there would be no UL feedback for downlink (DL) transmission. However, even though HARQ or its feedback may be disabled, it may still be desirable to improve the reliability of the system, such as for critical communications in remote areas, which may be one possible application for NTN scenarios. As such, it has been proposed that if HARQ feedback is disabled, blind HARQ (re)transmissions may still improve robustness. Furthermore, even if HARQ feedback is disabled, the HARQ process may still be configured. Moreover, enabling/disabling the HARQ feedback may be a network decision.

Additionally, in certain cases, decoding the error may cause the transmitter to erroneously recognize an acknowledgment (ACK) from the receiver as a negative acknowledgement (NACK), or vice versa. This may lead to state inconsistency at the transmitter and receiver sides, and further lead to decoding error. Thus, certain example embodiments may provide solutions to at least this problem.

Certain alternatives to enhance link robustness may be available. One alternative may include time transmission interval (TTI) bundling/slot aggregation. The TTI bundling may be a solution deployed for voice-over-LTE (VoLTE) in the uplink (UL). This concept may minimize the latency between the transmission and the rightful reception of a given message. In this concept, when the MCS used by a given user cannot be "downgraded" (i.e., the UE is already at the most robust level of MCS transmission, and the power cannot be elevated anymore), the TTI bundling may be triggered. In the TTI bundling, a UL grant corresponds to 4 consecutive TTIs, where the UE must retransmit or transmit the same information 4 times, each using a different redundancy version (RV). Thus, the TTI bundling triggers 4-repetitions of the information in advance, thereby improving the reliability at the expense of possible overuse of physical resources. A similar method may be used for range extension in the narrowband IoT (NB-IoT), and enhanced machine type communication (eMTC).

Another alternative to enhance link robustness may include proactive K-repetitions. In this scheme, a high-reliability may be enforced in a latency constrained transmission by means of proactive K-retransmissions. Under this alternative, for every packet of information to be transmitted, the user may send K-retransmissions of it, regardless of any HARQ feedback. This may result in potential to improve reliability, but it may overload the physical air interface. For example, when K=1, at least twice as many resources are expended in the air interface (i.e., 20 physical resource allocations are needed for 10 transport blocks).

With proactive K-repetitions, satellite networks may be expected to cover large areas, with cell ranges that may go above 500 km These satellite networks may also have a limited link budget due to the large distances between users and satellites. Thus, it may be possible that, in certain situations, there are limited resources available in the PHY to be distributed among the UEs. Further, if K-repetitions are applied to most of the resources, there may be insufficient resources in the network.

An additional alternative to enhance link robustness may include radio link control (RLC) requirements. For example, when a certain number of HARQ retransmission has elapsed, the RLC depending on the configured mode for the transmission (e.g., acknowledged mode) may trigger an RLC level retransmission. Further, whenever an RLC retransmission occurs, the HARQ process may be re-initiated.

In certain cases, both TTI bundling and proactive repetitions may be based on the effectiveness of having extra parity bits transmitted, even in the absence of feedback transmission. However, adaptive retransmission may improve the system performance and throughput. For instance, certain example embodiments may improve the link robustness, when the system may not rely on the HARQ feedback, but with less overhead on the PHY resource utilization. As described herein, certain example embodiments may also provide a method that pre-allocates PHY resources (e.g., via semi-persistent scheduling (SPS)) exclusively for redundant data transmission of any active HARQ process ID at the UE side. Certain example embodiments may further provide a time-based or event-based method for implicitly (i.e., with no additional signaling required) splitting the PHY resources pre-allocated to a particular UE among different HARQ processes. In addition, certain example embodiments may provide solutions to solve the state inconsistency problem caused by erroneously decoding of ACK/NACK. According to some example embodiments, certain devices may identify the number of the extra parity bits in each redundant transmit block (TB) based on the number of eligible HARQ processes for retransmission, and the number of allocated physical resource blocks (PRBs) by the SPS. Furthermore, the network may configure the SPS periodicity to adapt to variations in the channel condition or to the user throughput.

FIG. 1 illustrates configured SPS opportunities, according to certain example embodiments. In certain example embodiments, the gNB may pre-allocate $N_{PRB}$ PRBs in the PHY layer, with a periodicity of X TTIs. According to certain example embodiments, these resources may be exclusively reserved for redundant incremental data, and not for any new piece of data. In these opportunities, no new data is allowed; just incremental data may be transmitted. In addition, according to certain example embodiments, X may be configured by the gNB (e.g., base station), and may define the periodicity of SPS resources in the time domain In some example embodiments, X may not be too short in order to prevent too many resources from being occupied. In addition, X may not be too long, otherwise the resources may not be able to be used to effectively reduce the long HARQ delay. In certain example embodiments, the value of X may be determined by using a formula such as r*RTT, where RTT refers to the round-trip time between the UE and the base station, and r is a ratio to be adjusted. According to certain example embodiments, the values for r may be, for example, ¼, ½, 1, or 2, where other values are also possible. Further, in some example embodiments, at every scheduled opportunity associated with the SPS, there may be multiple transport blocks to be transmitted by the gNB (if DL) or the UE (if UL).

Figure 2:
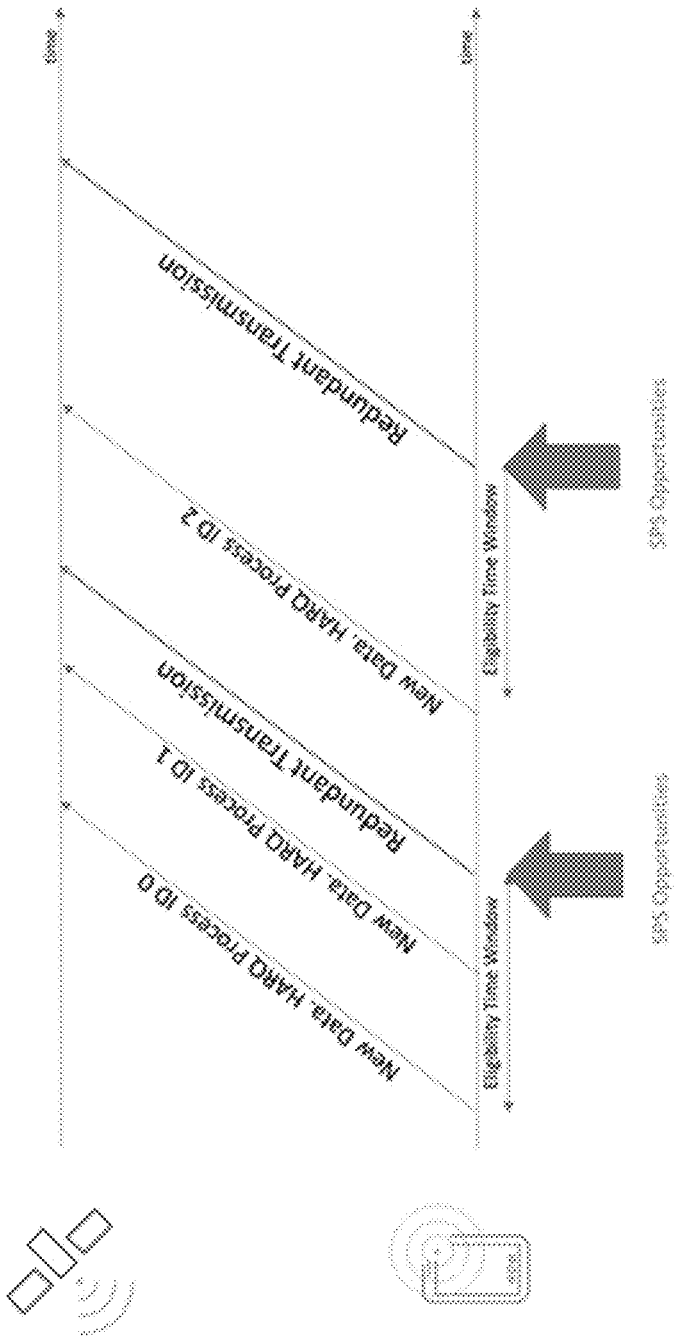
FIG. 2 illustrates a time-based eligibility for incremental data transmission, according to certain example embodiments.

FIG. 2 illustrates a time-based eligibility for incremental data transmission, according to certain example embodiments. As illustrated in FIG. 2, the data transmitted from HARQ processes ID 0 and 1 may be eligible for incremental data transmission in the first redundant transmission, whereas in the second opportunity, just the process ID 2 may be eligible for it. According to certain example embodiments, in transmitting device (e.g., gNB or UE), the number of HARQ process IDs may be checked to determine whether they are eligible for redundant data transmission. In certain example embodiments, this checking procedure may be based on a time-based method or an event-based method.

In the time-based method, the eligible processes may include those whose last transmission was taken within a given time from the actual transmission. For example, HARQ processes that have seen a transmission in the TTIs [k−x, k−1], where k is the current slot and x is a parameter set by the gNB (see FIG. 2). However, in the event-based method, the eligible processes may be the set of M−M$_{ack}$ HARQ processes, where M is a parameter set by the gNB, and M$_{ack}$ is the number of processes from which the gNB has received an acknowledgement, or that has experienced a predetermined maximum number of data transmissions. In certain example embodiments, the predetermined maximum number of data transmissions may be set to 3. However, in other example embodiments, the predetermined maximum number of data transmissions may be different from 3.

According to certain example embodiments, the transmitter (e.g., the gNB or the UE) may split the $$N_{PRB} \text{ into } n_{prb} = \left\lceil \frac{N_{PRB}}{\# \text{ of eligible } HARQ \text{ processes}} \right\rceil.$$

In certain example embodiments, the MAC layer may then create additional bits to be transmitted as incremental data for the eligible processes. In doing so, the amount of data for each process may be given by $n_{prb}$ and the current MCS set in the SPS. In addition, MAC procedures may then be adjusted for a transmission of $n_{prb}$ for each of the processes. According to certain example embodiments, at the receiver end, the PHY may read multiple transport blocks for the same DCI by knowing and applying a similar set of rules. In some example embodiments, the MAC layer for each TB may then be applied independently.

In certain example embodiments, if no data HARQ process is eligible for retransmission, the SPS opportunity may be skipped by the transmitting device. In addition, the number of incremental opportunities for each TB may be limited to a predefined maximum number, which may be set by the base stations to define the maximum number of possible re-transmissions of a given TB in SPS opportunities. Further, in some example embodiments, a predetermined minimum number of $n_{prb}$ to each process $n_{prb_{min}}$ may be set by the base station. If the number of HARQ process identifiers (IDs) or HARQ processes eligible is large such that $n_{prb} < n_{prb_{min}}$ or $n_{prb} < 1$, an implicit extra opportunity may be pre-set by the gNB for these situations. Further, in certain example embodiments, a selection policy known by the transmitter and the receiver may be instituted (most recent TBs, data with less incremental transmissions, etc.) to decide which PRBs shall have the priority of incremental data transmission.

According to certain example embodiments, the SPS may alternatively configure a variable number of PRBs proportional to the eligible HARQ process IDs on each transmission instant. Furthermore, the size of $n_{prb}$ may be set uneven to be proportional to the TB sizes previously transmitted.

Figure 3:
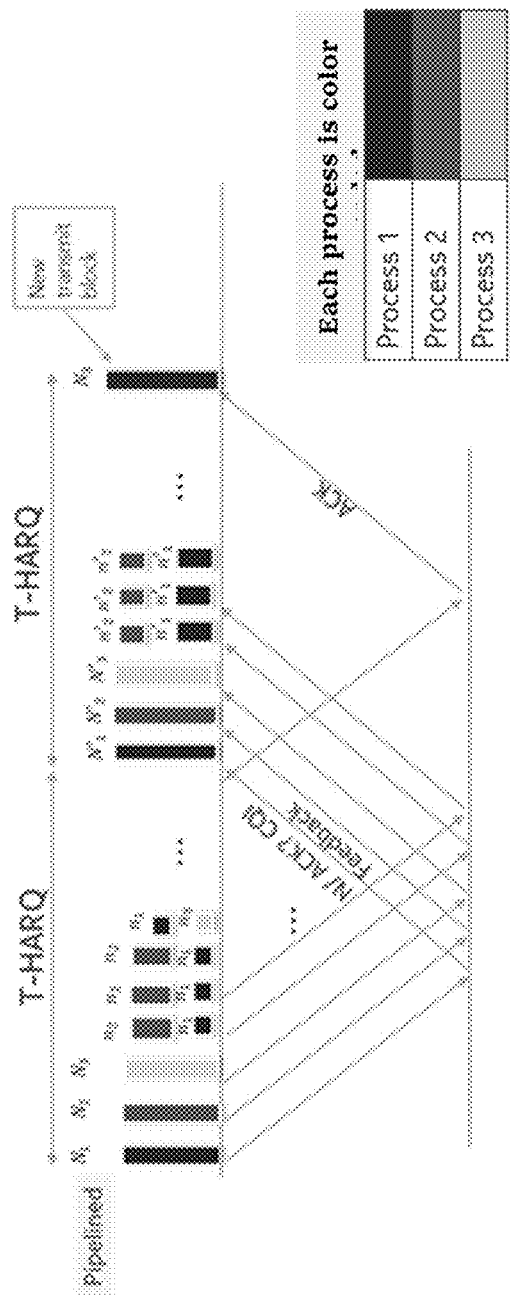
FIG. 3 illustrates a pipeline of multiple process handling, according to certain example embodiments.

FIG. 3 illustrates a pipeline of multiple process handling, according to certain example embodiments. As illustrated in FIG. 3, the transmitter may aggressively send packets at every available transmission chance. According to certain example embodiments, original data may be prepared for transmission. After the preparation, channel quality indicator (CQI) information of the transmission link may be obtained. Further, after obtaining the CQI information, the number of packets and the coding rate needed for transmission may be estimated. Thus, the blind continuous pipeline transmission may continue until the transmitter explicitly receives an ACK from the receiver or the maximum allowable retransmission is reached. For instance, in certain example embodiments, the maximum allowable retransmission may be 3. However, in other example embodiments, the maximum allowable retransmission may be different than 3. Once NACK feedback is received, the transmitter may exploit the received control data and CQI of the link, and update the coding rate and the number of transmission, and continue the continuous pipeline transmission.

As illustrated in FIG. 3, the number of repetitions of the small add-on packets may be determined based on the obtained CQI. Once the number of repetitions is obtained, multiple processes may be scheduled during one T-HARQ. According to certain example embodiments, this may be accomplished via fair scheduling of the processes and scheduling alternating slots for multiple small redundancy versions (sRVs) of the same packet, and setting the number of repetitions according to the HARQ feedback for these slots. Once HARQ feedback is received, if it is a NACK, then another redundancy version RV of size N may be sent.

According to certain example embodiments, after determining the number of repetitions, the gNB may be able to transmit the packets with their set of redundancy versions continuously in consecutive slots before HARQ feedback is received. In certain example embodiments, the slots may use a fixed number of repetitions and the same set of redundancy versions. In certain example embodiments, the slots may use a fixed number of repetitions and the same set of redundancy versions. Further, each packet may be allocated a separate HARQ process for soft combining.

According to certain example embodiments, the procedure of soft combining may involve the sender checking if there is an SPS opportunity. If yes, then additional coded bits may be sent in this opportunity without the reception of the potential ACK/NACK from the receiver. Further, the receiver may save all the coded bits received in every SPS opportunity to the soft buffer. In addition, in soft combining, if there is a decoding failure, the receiver may save the received code block to a soft buffer. Meanwhile, the receiver may notify the sender by sending a NACK that it was not able to decode the packet.

The soft combining may also involve the sender performing a re-transmission by sending more coded bits for the same packet. In addition, the receiver may collect the re-transmitted coded bits, and save them to the soft buffer. Furthermore, the receiver may perform decoding with all the coded bits in the soft buffer, including the bits of the initial transmission, the regular re-transmissions, and the SPS opportunities. In addition, if the decoding is a success, then this HARQ process is ended. Otherwise, the procedure returns to the receiving saving the received code block to a soft buffer, and notifying the sender by sending a NACK that it was not able to decode the packet. Further, if the maximum number of re-transmissions is reached, the receiver may claim a final decoding failure, and terminate the HARQ process. This maximum number of re-transmissions may be set, for example, to 3.

If a packet is successfully decoded before the end of the transmission of all redundancy versions (RVs and sRVs), the memory may be used by the process, and the soft buffer may be flushed. Thus, in certain example embodiments, the soft buffer size requirement may be reduced when the RTT is long. For example, in certain example embodiments, the medium earth orbits (MEO) and geostationary earth orbit (GEO) cases may have RTT ranging from 200 ms to 541.46 ms, which are longer than terrestrial cases. In addition, according to certain example embodiments, it may not be necessary to wait for the feedback (ACK/NACK feedback), but the packets may be continuously transmitted within a transmission period that is shorter than the RTT until the transmitter (TX) receives an ACK.

Certain example embodiments may minimize the impact on spectral efficiency while reducing the impact of the long RTT. For example, a multiplexing (MUX)-based pipeline HARQ mechanism may be provided. As illustrated in FIG. 3, the same HARQ pipeline solution may be applied, but the small chunks may be multiplexed with multiplex order m with the other processes on the same slots to enhance the spectral efficiency. As such, it may be possible to limit the effect of wasting resources, and therefore optimize spectral efficiency (SE).

Figure 4:
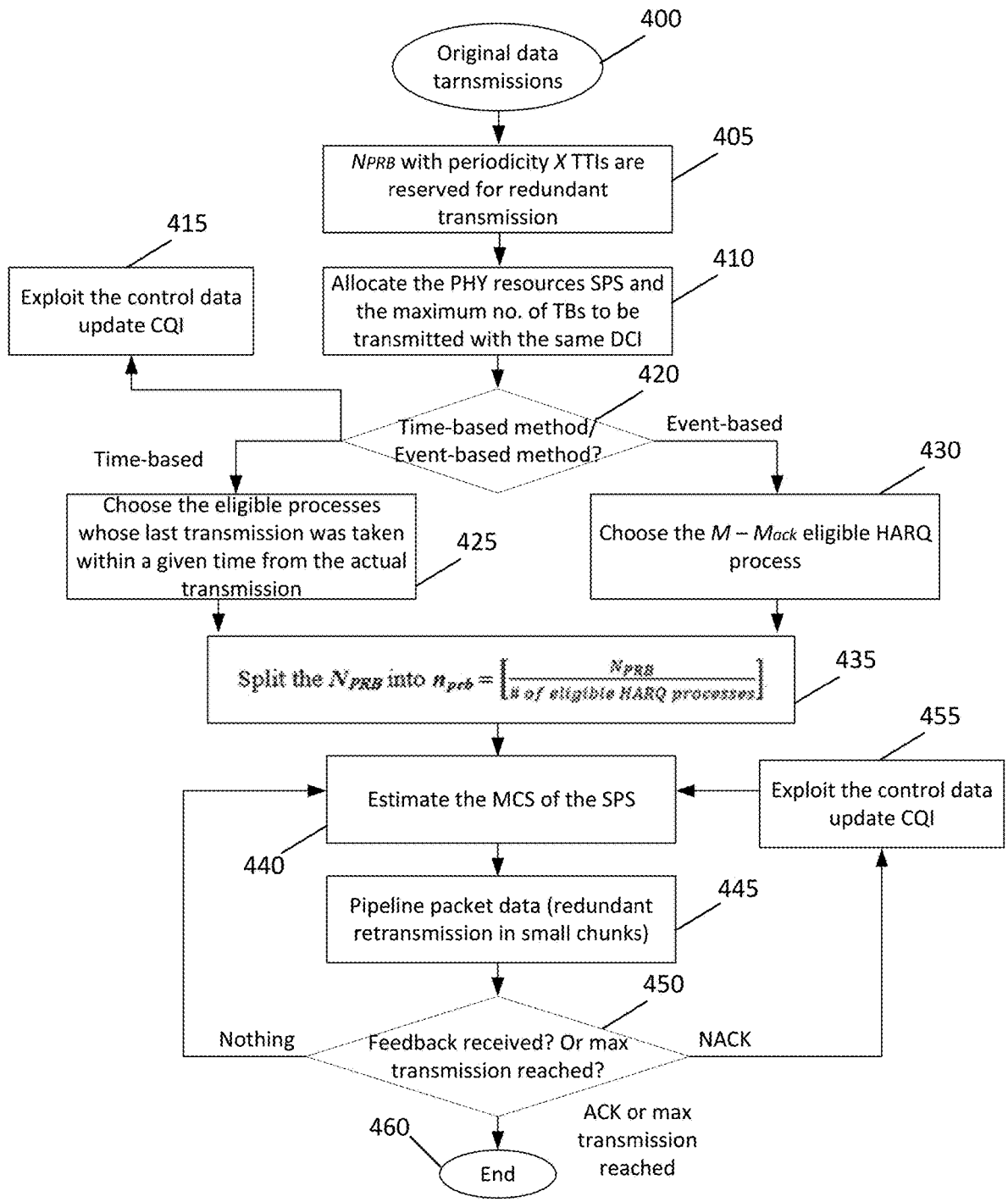
FIG. 4 illustrates a pipeline method at the transmitter side, according to certain example embodiments.

FIG. 4 illustrates a pipeline method at the transmitter side, according to certain example embodiments. In certain example embodiments, the pipeline method of FIG. 4 may be performed by a transmitting device such as a telecommunications network entity or network node in a 3GPP system, such as LTE or 5G-NR. For instance, in an example embodiment, the pipeline method of FIG. 4 may be performed by a gNB, for instance similar to apparatus 20 illustrated in FIG. 8(b). However, in certain example embodiments, one or more of the functions of the pipeline in FIG. 4 may be performed by a UE.

As illustrated in FIG. 4, during an original data transmission 400, the transmitting device may, at 405, pre-allocate or reserve $N_{PRB}$ with periodicity X for redundant transmission. Further, at 410, the transmitting device may allocate PHY resources via SPS and the maximum or predetermined number of TBs (e.g., "M" in the event-based method) to be transmitted with the same DCI. In certain example embodiments, the upper limit of M may be the maximum number of allowed HARQ processes, which may be, for example, 16. In addition, the lower limit of M may be set to 0, which disables the SPS re-transmission mechanism. In other example embodiments, the exact value of M may be selected by the base stations. At 415, the transmitting device may check how many HARQ process IDS are eligible for redundant transmission. In addition, at 420, the transmitting device may determine to apply a time-based method or an event-based method for implicitly splitting the PHY resources pre-allocated to a particular UE among different HARQ processes.

If a time-based method is applicable, then, at 425, the transmitting device may choose the eligible processes whose last transmission was taken within a given time from the actual transmission. However, if an event-based method is applicable, then, at 430, the transmitting device may choose the eligible processes as the set of $M-M_{ack}$ eligible HARQ processes. At 435, the transmitting device may split the $$N_{PRB} \text{ into } n_{prb} = \left[ \frac{N_{PRB}}{\# \text{ of eligible } HARQ \text{ processes}} \right].$$

At 440, the transmitting device may estimate the MCS of the SPS and, at 445, the transmitting device may begin pipeline transmission of packet data, which may include redundant retransmission in small chunks. At 450, the transmitting device determines whether feedback is received, or whether a maximum allowable retransmission has been reached. When a NACK feedback is received, the transmitting device, at 455, may exploit the received control data and CQI of the link, and update the coding rate and the number of transmissions, and continues the continuous pipeline transmission (steps 440, 445, and 450). If no feedback is received, the procedure returns to 440. However, if an ACK is received, or the predetermined maximum number of redundant transmissions has been reached, the procedure ends at 460.

According to certain example embodiments, allocation of the physical layer resources may be performed via SSP. According to other example embodiments, the packet of the redundant transmission may be characterized by a redundancy version, and the redundancy version may be identified by a system frame number or a two-bit indicator. In certain example embodiments, a number of the physical layer resources may be proportional to a number of eligible hybrid automatic repeat request process identifiers.

Figure 5:
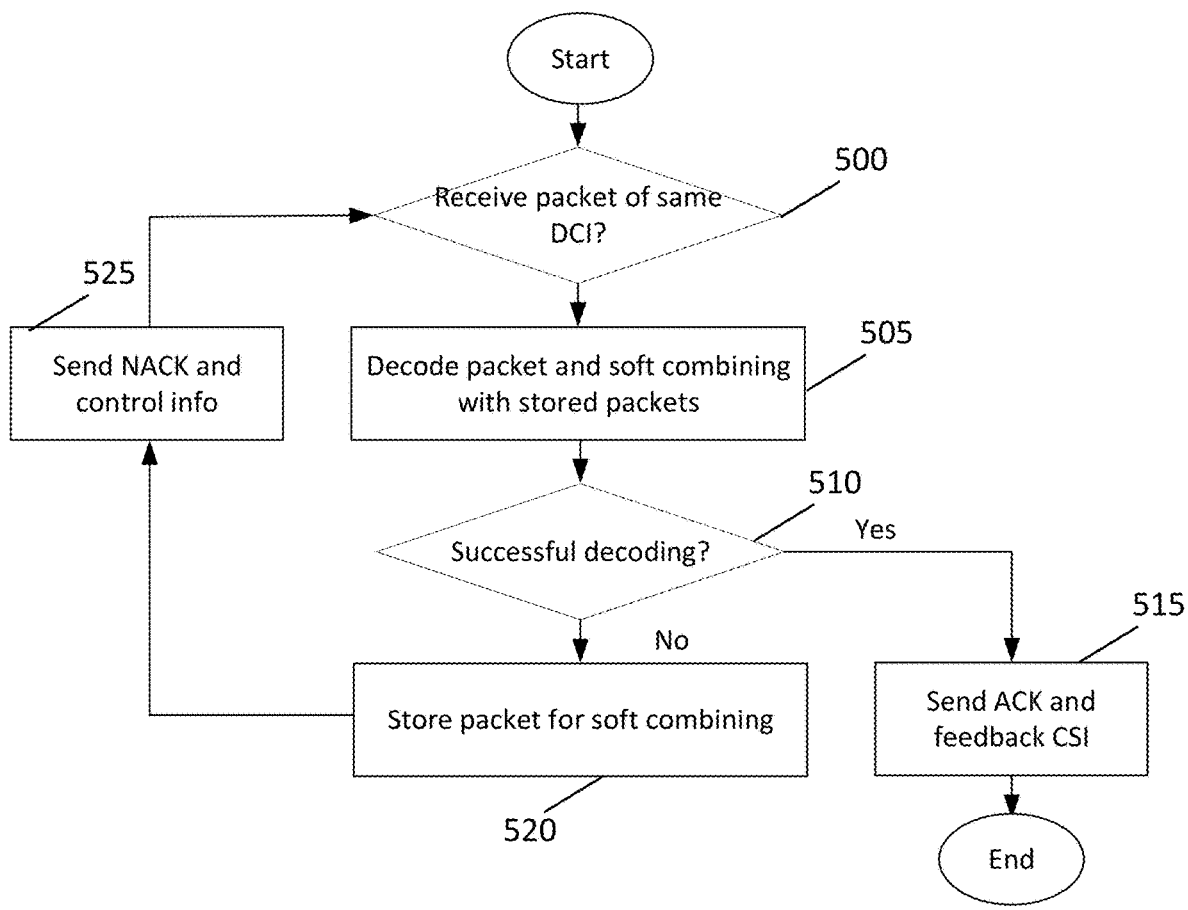
FIG. 5 illustrates a pipeline method at the receiver side, according to certain example embodiments.

FIG. 5 illustrates a pipeline method at the receiver side, according to certain example embodiments. In certain example embodiments, the pipeline method of FIG. 5 may be performed by a receiving device such as a telecommunications network entity or network node in a 3GPP system, such as LTE or 5G-NR. For instance, in an example embodiment, the pipeline method of FIG. 5 may be performed by a UE, for instance similar to apparatuses 10 illustrated in FIG. 8(a). However, in certain example embodiments, one or more of the functions of the pipeline in FIG. 4 may be performed by a gNB.

As illustrated in FIG. 5, at 500, the receiving device may determine whether a packet of a same DCI has been received. If no, the receiving device wait until the packet of the same DCI has been received. After the packet of the same DCI has been received, at 505, the receiving device may decode the packet and softly combine the received packet with a previously stored packet. At 510, the receiving device may determine whether the decoding was successful. If the decoding was successful then, at 515, the receiving device may send an ACK and feedback channel state information (CSI) to the transmitting device. However, if the decoding was not successful, then, at 520, the receiving device may store the received packet for soft combining with previous unsuccessfully decoded packets. At 525, the receiving device may send a NACK and control information to the transmitting device, and return to 500 to receive packet data of the same DCI. According to certain example embodiments, the receiving device may drop the packets that correspond to the ones that were successfully decoded in the previous transmissions.

According to certain example embodiments, the feedback may include channel state information. According to other example embodiments, each repetitive packet of the set of repetitive packets may be characterized by a corresponding small redundancy version. In certain example embodiments, the redundancy version may be identified by a system frame number or a two-bit indicator.

As previously noted, decoding error may cause the transmitter to erroneously recognize an ACK from the receiver to NACK, or vice versa. This may lead to state inconsistency at the transmit and receive sides, and further lead to code block decoding error. Thus, to address this issue, certain example embodiments may define the version number of the nth small RV as $sRV_n$, which may take values over $\{0, 1, \ldots, SRV_{max}-1\}$. Furthermore, the starting and ending values of sRV in a SPS transmission may be denoted by sRV_start and sRV_end. In addition, at each SPS transmission opportunity, both transmit and receive sides may have the same knowledge about the $sRV_n$ even when ACK/NACK decoding error occurs.

To avoid decoding error, certain example embodiments may provide a system frame number (SFN)-based approach. For example, under this approach, in 5G NR, each frame may be identified by an SFN, which may be designed to define transmission cycles with periods longer than one frame. The SFN itself may be a number with a period of 1024, and may increase by 1 frame. Thus, the SFN may repeat itself after 1024 frames or 10.24 s. According to certain example embodiments, in the SFN-based approach, SFN may be used to define the sRV versions in each transmission to avoid possible decoding ambiguity in both sides.

Figure 6:
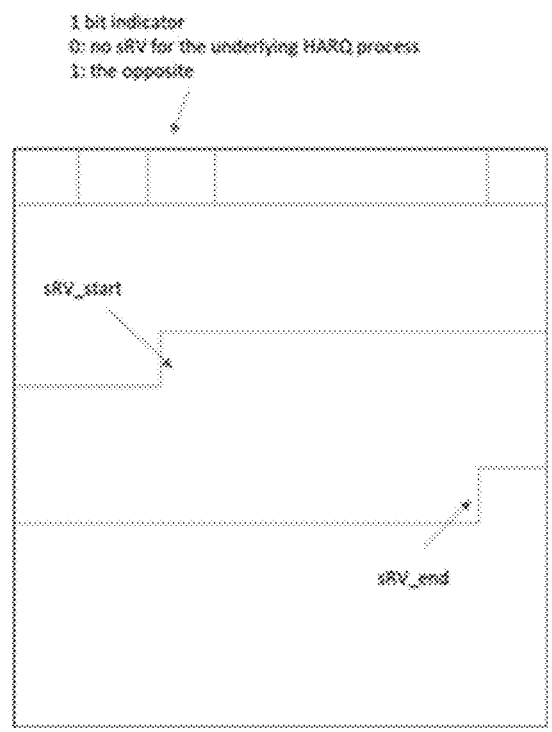
FIG. 6 illustrates a data block structure for a SPS transmission opportunity, according to certain example embodiments.

FIG. 6 illustrates a data block structure for a SPS transmission opportunity, according to certain example embodiments. In this approach, the sRV_start may be defined as a function of SFN. For example, sRV_start=f(SFN), and sRV_end may be derived based on sRV_start. According to certain example embodiments, for sRV_start, sRV_start=f(SFN) may be defined as SFN % $sRV_{max}$. In other example embodiments, sRV_start=f(SFN) may be defined as (SFN*k) % $sRV_{max}$. In one example, this may be used where $sRV_{max}$ is larger than 1024. In this case, the starting sRV may be evenly distributed with the appropriate selection of k. According to certain example embodiments, sRV_end=sRV_start+the sRVs in the given SPS opportunity. This may be calculated by the total number of sRVs in one SPS opportunity or the number of HARQ processes with sRV transmission in this SPS opportunity.

Figure 7:
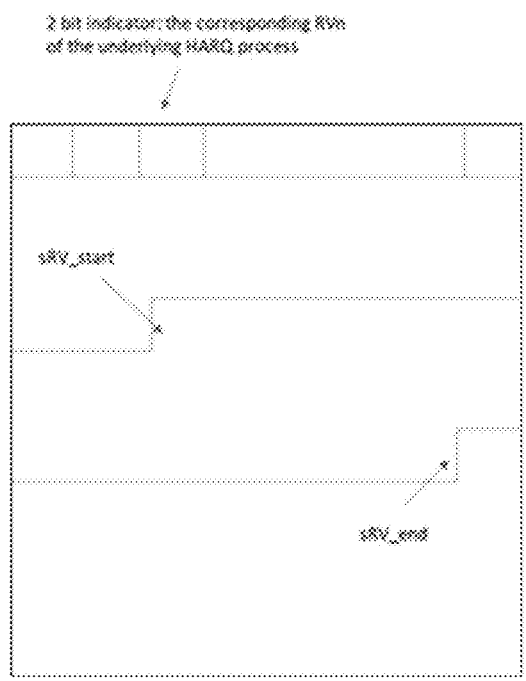
FIG. 7 illustrates another data block structure for a SPS transmission, according to certain example embodiments.

FIG. 7 illustrates another data block structure for a SPS transmission, according to certain example embodiments. In this approach, $RV_n$ may be utilized to define the $sRV_n$. According to certain example embodiments, the sRV transmission may accompany the HARQ process, where a regular RV may be transmitted. In certain example embodiments, the nth RV may be defined as $RV_n$. Under this approach, a two-bit indicator may be used in the header, which may in turn be used to indicate the most recent RV number of the corresponding HARQ process. With the two-bit indicator, the receiver may have the opportunity to obtain the correct RV number even when an ACK/NACK error occurs. According to certain example embodiments, under the $RV_n$ approach, the sRV_start may be defined as a function of $RV_n$, where sRV_start=f($RV_n$), and sRV_end may be derived based on sRV_start.

In certain example embodiments, sRV_start=f($RV_n$) may be defined as the sRV closest to $RV_n$ in the circular buffer. In other example embodiments, sRV_start=f($RV_n$) may be defined as the sRV with a constant gap to $RV_n$ in the circular buffer. According to certain example embodiments, sRV_end=sRV_start+the number of sRVs in the given SPS opportunity. This may be calculated by the total number of sRVs in one SPS opportunity or the number of HARQ processes with sRV transmission in this SPS opportunity.

Figure 8A:
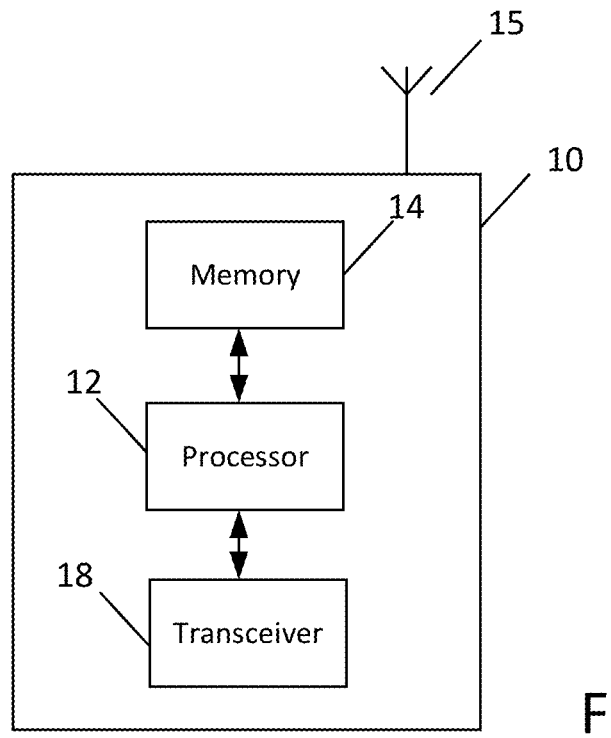
FIG. 8(a) illustrates an apparatus, according to certain example embodiments.
Figure 8B:
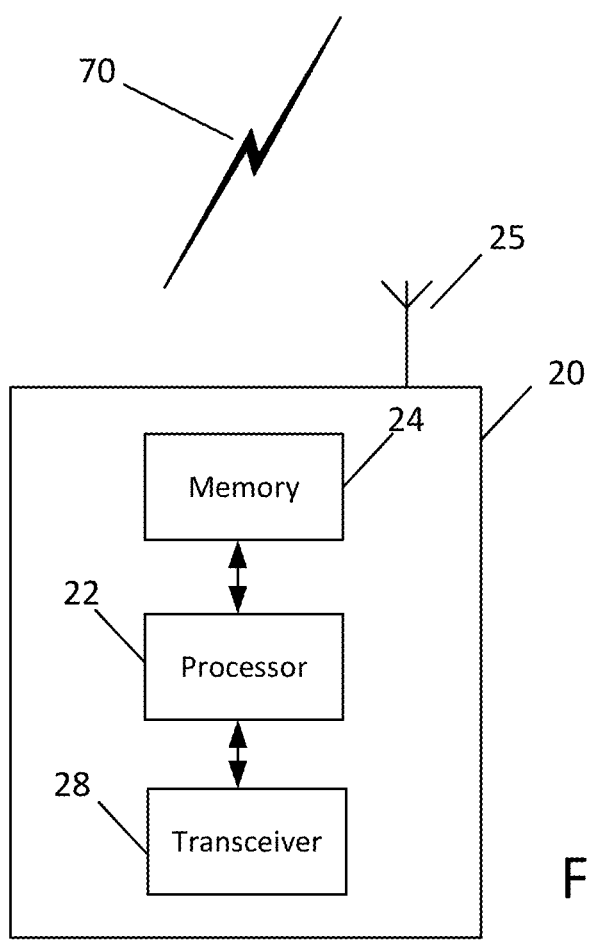
FIG. 8(b) illustrates another apparatus, according to certain example embodiments.

FIG. 8(a) illustrates an apparatus 10 according to certain example embodiments. In certain example embodiments, apparatus 10 may be a node or element in a communications network or associated with such a network. For instance, in certain example embodiments, apparatus 10 may be a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. In other example embodiments, apparatus 10 may be implemented in, for instance, a wireless handheld device, a wireless plug-in accessory, or the like.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 8(a).

As illustrated in the example of FIG. 8(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-7.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-7.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

As discussed above, according to certain example embodiments, apparatus 10 may be a UE for example. According to certain embodiments, apparatus 10 may be controlled by memory 14 and processor 12 to determine whether a packet of a same downlink control information has been received. Apparatus 10 may also be controlled by memory 14 and processor 12 to decode the packet. Apparatus 10 may further be controlled by memory 14 and processor 12 to determine whether the decoding was successful. In addition, apparatus 10 may be controlled by memory 14 and processor 12 to, when the decoding is successful, send an acknowledgment message and feedback to a transmitting device. Further, apparatus 10 may be controlled by memory 14 and processor 12 to, when the decoding is unsuccessful, send a negative acknowledgment and control information to the transmitting device.

FIG. 8(*b*) illustrates an apparatus 20 according to certain example embodiments. In certain example embodiments, the apparatus 20 may be a network element, node, host, or server in a communication network or serving such a network. For example, apparatus 20 may be a network element including, for example, a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 8(*b*).

As illustrated in the example of FIG. 8(*b*), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8(*b*), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-7.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-7.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT- LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiments, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 20 may be a network element, node, host, or server in a communication network or serving such a network. For example, apparatus 20 may be a AMF, SMF, satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain example embodiments, apparatus 20 may be controlled by memory 24 and processor 22 to perform the functions associated with any of the embodiments described herein.

For instance, in certain example embodiments, apparatus 20 may be controlled by memory 24 and processor 22 to reserve physical layer resources exclusively for redundant transmission. Apparatus 20 may also be controlled by memory 24 and processor 22 to allocate the physical layer resources and a predetermined number of transmit blocks to a receiving device. Apparatus 20 may further be controlled by memory 24 and processor 22 to check how many hybrid automatic repeat request process identifiers are eligible for redundant transmission. In addition, apparatus 20 may be controlled by memory 24 and processor 22 to split the physical layer resources based on a number of hybrid automatic repeat request process identifiers that are eligible for redundant transmission. Further, apparatus 20 may be controlled by memory 24 and processor 22 to estimate a modulation and coding scheme based on the number of physical layer resources that have been split. Apparatus 20 may also be controlled by memory 24 and processor 22 to perform a redundant retransmission of packet data based on the modulation and coding scheme.

Further example embodiments may provide means for performing any of the functions, steps, or procedures described herein. For example one example embodiment may be directed to an apparatus that includes means for determining whether a packet of a same downlink control information has been received. The apparatus may also include means for decoding the packet. The apparatus may further include means for determining whether the decoding was successful. In addition, the apparatus may include means for, when the decoding is successful, sending an acknowledgment message and feedback to a transmitting device. The apparatus may also include means for, when the decoding is unsuccessful, sending a negative acknowledgment and control information to the transmitting device.

Other example embodiments may be directed to an apparatus that includes means for reserving physical layer resources exclusively for redundant transmission. The apparatus may also include means allocating the physical layer resources and a predetermined number of transmit blocks to a receiving device. The apparatus may further include means for checking how many hybrid automatic repeat request process identifiers are eligible for redundant transmission. In addition, the apparatus may include means for splitting the physical layer resources based on a number of hybrid automatic repeat request process identifiers that are eligible for redundant transmission. The apparatus may also include means for estimating a modulation and coding scheme based on the number of physical layer resources that have been split. Further, the apparatus may include means for performing a redundant retransmission of packet data based on the modulation and coding scheme.

Certain example embodiments described herein provide several technical improvements, enhancements, and /or advantages. In some example embodiments, it may be possible to minimize the number of DCIs required for the same amount of incremental redundancy for each transmission. It may also be possible to provide dynamic adjustment for the channel conditions or quality of service (QoS) variations. Other example embodiments may also allow fractional overhead of the PHY resources (i.e., one transmission opportunity for several TBs instead of one or more for each TB in the slot aggregation implementation). According to further example embodiments, small chunks of redundant data may boost the reliability of link.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary
  ACK Acknowledgement
  BLER Block Error Rate
  CQI Channel Quality Indicator
  DL Downlink
  eMTC Enhanced Machine-type Communication
  eNB Enhanced Node B
  GEO Geostationary Earth Orbit
  gNB 5G or Next Generation NodeB
  HARQ Hybrid Automatic Repeat Request
  IR Incremental Redundancy
  LEO Low Earth Orbit
  LTE Long Term Evolution
  MCS Modulation and Coding Scheme
  MUX Multiplexing
  NACK Negative Acknowledgment
  NB-IoT Narrowband Internet of Things
  NR New Radio
  NTN Non-terrestrial Networks
  PDF Probability Distribution Function
  PHY Physical Layer
  QoS Quality of Service
  RLC Radio Link Control
  RS Redundancy Sequence
  RTT Roundtrip Time
  RV Redundancy Versions
  SE Spectral Efficiency
  SFN System Frame Number
  SPS Semi Persistent Scheduling
  sRV Small Redundancy Versions
  TB Transmit Block
  TCP Transmission Control Protocol
  TN Terrestrial Networks
  TTI Transmission Time Interval
  TX Transmitter
  UE User Equipment
  UL Uplink
  VoLTE Voice-over LTE

We claim:

1. A method, comprising:
reserving or receiving reservation of physical layer resources exclusively for redundant transmission;
allocating the physical layer resources and a predetermined number of transmit blocks, wherein the predetermined number of transmit blocks are associated with a downlink control information (DCI);
checking a number of hybrid automatic repeat request process identifiers that are eligible for redundant transmission; and
splitting the physical layer resources based on the number of hybrid automatic repeat request process identifiers that are eligible for redundant transmission,
the method further comprising determining whether to apply a time-based method or an event-based method for splitting the physical layer resources,
wherein when the event-based method is applicable, the method further comprises choosing the eligible hybrid automatic repeat request process identifiers as a set of $M-M_{ack}$ hybrid automatic repeat request processes, where M is a parameter set by a transmitting device, and $M_{ack}$ is a number of processes from which the transmitting device has received an acknowledgement or that has experienced a predetermined number of additional data transmission.

2. The method according to claim 1, wherein the allocating is via semi-persistent scheduling.

3. The method according to claim 1,
wherein the packet of the redundant transmission is characterized by a redundancy version, and
wherein the redundancy version is identified by a system frame number or a two-bit indicator.

4. The method according to claim 1, wherein when the time-based method is applicable, the method further comprises choosing the eligible hybrid automatic repeat request process identifiers whose last transmission was taken within a given time from an actual transmission.

5. The method according to claim 1, further comprising estimating a modulation and coding scheme; and
performing a redundant retransmission of packet data based on the modulation and coding scheme.

6. An apparatus, comprising:
at least one processor; and
at least one memory comprising computer program code,
the at least one memory and computer program code are configured, with the at least one processor, to cause the apparatus at least to:

reserve or receive reservation of physical layer resources exclusively for redundant transmission;
allocate the physical layer resources and a predetermined number of transmit blocks, wherein the predetermined number of transmit blocks are associated with a downlink control information (DCI);
check a number of hybrid automatic repeat request process identifiers that are eligible for redundant transmission; and
split the physical layer resources based on the number of hybrid automatic repeat request process identifiers that are eligible for redundant transmission,
wherein the apparatus is further caused to determine whether to apply a time-based method or an event-based method for splitting the physical layer resources,
wherein the event-based method comprises choosing the eligible hybrid automatic repeat request process identifiers as a set of $M-M_{ack}$ hybrid automatic repeat request processes, where M is a parameter set by a transmitting device, and $M_{ack}$ is a number of processes from which the transmitting device has received an acknowledgement or that has experienced a predetermined number of additional data transmission.

7. The apparatus according to claim 6, wherein the allocating is via semi-persistent scheduling.

8. The apparatus according to claim 6,
wherein the packet of the redundant transmission is characterized by a redundancy version, and
wherein the redundancy version is identified by a system frame number or a two-bit indicator.

9. The apparatus according to claim 6, wherein the time-based method comprises choosing the eligible hybrid automatic repeat request process identifiers whose last transmission was taken within a given time from an actual transmission.

10. The apparatus according to claim 6, the apparatus is further caused to:
estimate a modulation and coding scheme; and
perform a redundant retransmission of packet data based on the modulation and coding scheme.

11. An apparatus, comprising:
at least one processor; and
at least one memory comprising computer program code,
the at least one memory and computer program code are configured, with the at least one processor, to cause the apparatus at least to:
receive packet on physical layer resources that are reserved exclusively for redundant transmission;
determine whether the received packet are associated with a downlink control information (DCI);
in response to determining the received packet are associated with the DCI, determine a number of hybrid automatic repeat request process identifiers that are eligible for redundant transmission; and
decode the packet associated with the number of hybrid automatic repeat request process identifiers,
wherein the determining a number of hybrid automatic repeat request process identifiers that are eligible for redundant transmission comprises determining whether a time-based method or an event-based method is utilized,
wherein when the event-based method is applicable, the method further comprises choosing the eligible hybrid automatic repeat request process identifiers as a set of $M-M_{ack}$ hybrid automatic repeat request processes, where M is a parameter set by a transmitting device, and $M_{ack}$ a number of processes from which the transmitting device has received an or that has experienced a predetermined number of additional data acknowledgement transmission.

12. The apparatus according to claim 11, wherein the receiving is via semi-persistent scheduling.

13. The apparatus according to claim 11,
wherein the packet of the redundant transmission is characterized by a redundancy version, and
wherein the redundancy version is identified by a system frame number or a two-bit indicator.

14. The apparatus according to claim 11, wherein when the time-based method is applicable, the method further comprises choosing the eligible hybrid automatic repeat request process identifiers whose last transmission was taken within a given time from an actual transmission.

\* \* \* \* \*